United States Patent

McCrea

[15] 3,644,891
[45] Feb. 22, 1972

[54] FIELD POINT ADDRESSING SYSTEM AND METHOD

[72] Inventor: Alan F. McCrea, Richmond, Va.
[73] Assignee: Robertshaw Controls Company, Richmond, Va.
[22] Filed: Jan. 21, 1970
[21] Appl. No.: 4,578

[52] U.S. Cl............................................340/147, 340/163
[51] Int. Cl........................................................H04q 9/00
[58] Field of Search............................340/147, 163, 163 X

[56] References Cited

UNITED STATES PATENTS 3,516,063  6/1970  Arkin et al..............................340/163
3,522,588  8/1970  Clarke et al. ..........................340/163
3,484,694  12/1969  Brothman et al. .....................340/163

Primary Examiner—John W. Caldwell
Assistant Examiner—Howard Cohen
Attorney—Auzville Jackson, Jr., Robert L. Marben and Anthony A. O'Brien

[57] ABSTRACT

A system and method for addressing a plurality of field points having a group address and a point address including a group register for storing the group address of a selected field point and having counting means included therein for changing the stored group address, a point register for storing the point address of the selected field point and having counting means included therein for changing the stored point address, a field point selection input for entering the group and point addresses for the selected field point, and address changing inputs including an input for changing the stored group address in either a forward or backward manner without changing the stored point address, and an input for changing the stored point address in either a forward or backward manner without changing the stored group address.

13 Claims, 1 Drawing Figure

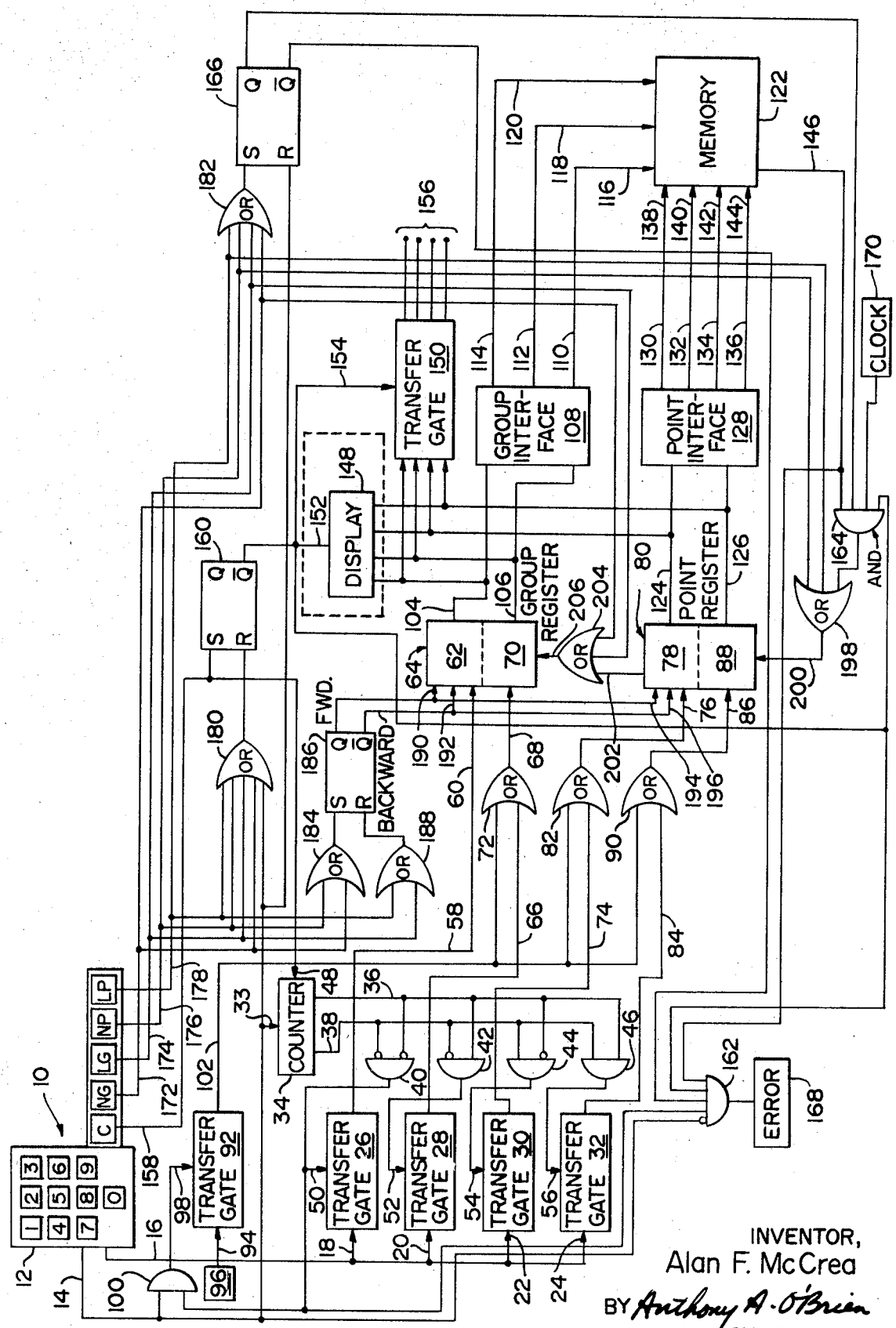

FIELD POINT ADDRESSING SYSTEM AND METHOD

BACKGROUND OF THE INVENTION

1. Field of the Invention

The present invention pertains to addressing systems and methods and, more particularly, to such systems and methods for addressing field points in a supervisory control system.

2. Description of the Prior Art

Centralization of supervisory control systems for buildings and building complexes has become very common in order to reduce the manpower required to supervise the many systems within the building or buildings. The systems to be supervised have greatly varying functional natures such as heating, cooling, lighting, water and electrical power distribution, and any processes that may be desirably controlled. Thus, an operator at a central control system station is normally confronted with a myriad of field points which must be supervised and controlled. In many supervisory control systems, the operator is assisted by computers which are utilized to provide control of the various system equipment throughout the building.

In order to permit an operator at a centralized supervisory control system to have complete control of the entire system, it has been the practice in the past to provide a reference manual of addresses of each of the field points within the system. Of course, the reference manual must also include the functional nature of the field point in that the operator will have to select the field points by their functional nature. That is, selected ones of the field points will permit the operator to monitor conditions thereat whereas other ones of the field point will permit the operator to control conditions thereat. In the past, an operator has had to make reference to the reference manual to determine the address of each field point to be selected; and, thereafter, the operator had to actuate an input device, such as a pushbutton, thumbwheel, or the like, to enter the address in an addressing system. If it was required of the operator to run a status scan of all of the motors under his control, he would have to determine the address of the field point for each motor and address them all individually. Furthermore, if an operator detected a malfunction or suspicious condition at one field point it might be required that he quickly jump to another closely related field point to determine other conditions associated with the malfunction or suspicious condition, such as with respect to cause and effect, prior to taking remedial action therefor.

SUMMARY OF THE INVENTION

The present invention is generally summarized in a system for addressing field points including a register for storing the address of a selected field point and including counting means for changing the stored address, a field point selection input for entering the selected field point address in the register and an address changing input for supplying a signal to the counting means to change the stored field point address.

It is an object of the present invention to provide a system for addressing related field points without manually determining the addresses thereof.

Another object of the present invention is to permit an operator to address a field point in another group of field points which is functionally related to a previously addressed field point without determining the address thereof.

A further object of the present invention is to program a computer to be responsive to an address input as well as an address change input for addressing the next point and the last point in a group of field points arranged in a predetermined order as well as related field points in other groups of field points.

The present invention has another object in that a method of addressing any of a plurality of field points grouped with respect to function automatically changes addresses from previously addressed field points to the next point in that group, the last point in that group, a related point in the next group and a related point in the last group.

Some of the advantages of the addressing system and method of the present invention over the prior art are that an operator may address a field point without previously determining the address thereof, an operator may easily address a new field point functionally related to a previously addressed field point without entering the exact address of the new field point, an operator's time in addressing field points is reduced, and the necessity of frequent use of a reference manual of field point addresses is reduced.

Further objects and advantages of the present invention will become apparent from the following description of the preferred embodiment taken in conjunction with the accompanying drawing.

BRIEF DESCRIPTION OF THE DRAWING

The FIGURE is a schematic representation of an addressing system according to the present invention.

DESCRIPTION OF THE PREFERRED EMBODIMENT

An addressing system according to the present invention is illustrated in the drawing and includes an addressing console 10 including an arrangement of numerical pushbuttons 12 numbered from 0 to 9, a "cancel" pushbutton C, a "next group" pushbutton NG, a "last group" pushbutton LG, a "next point" pushbutton NP, and a "last point" pushbutton LP. Numerical pushbuttons 12 are interconnected to provide a strike output on a lead 14 and a digit output on a four-wire cable 16. The strike output on lead 14 provides a logic 1 when any one of the numerical pushbuttons is depressed and a logic 0 before depression and after release of a numerical pushbutton. The numerical pushbuttons 12 are arranged such that the numerical value of a pushbutton depressed is indicated in binary coded decimal (BCD) fashion on the four wires.

The BCD output on cable 16 is supplied at data inputs 18, 20, 22 and 24 to a plurality of transfer gates 26, 28, 30 and 32, respectively. The strike output on lead 14 is supplied at an input 33 to a two-digit counter 34 which has outputs 36 and 38 providing four combinations of binary outputs therefrom. Each of outputs 36 and 38 are supplied to AND-gates 40, 42, 44 and 46 which are coded such that only one of the gates is enabled in response to counter 34. That is, when counter 34 is in its initial position or is reset by a 1 at a reset input 48, outputs 36 and 38 will be 0, and outputs 36 and 38 are inverted at AND-gate 40 such that AND-gate 40 is enabled to supply a 1 to a control input 50 for transfer gate 26. None of AND-gates 42, 44 or 46 will be enabled at this time since at least one input to each of the gates is a 0.

When a numerical pushbutton is released, counter 34 is stepped by strike output 14 such that output 36 goes to 1 and output 38 remains at 0, and only AND-gate 42 is enabled due to the inversion of output 38 thereat to supply a 1 to a control input 52 of transfer gate 28. When counter 34 is stepped again in response to another release of a numerical pushbutton, output 36 goes to 0 and output 38 goes to 1 and only AND-gate 44 is enabled due to the inversion of output 36 thereat to supply a 1 to a control input 54 of transfer gate 30. When outputs 36 and 38 of counter 34 are both 1 in response to another release of a numerical pushbutton, AND-gate 46 is enabled to supply a 1 to a control input 56 of transfer gate 32.

Transfer gate 26 supplies a first digit output, corresponding to the BCD output on cable 16 from numerical pushbuttons 12, on four wires in a cable 58 to an input 60 of a tens half 62 of a group register 64. Similarly, transfer gate 28 supplies a second digit output on four wires in a cable 66 to an input 68 of a units half 70 of group register 62 through an OR-gate 72, and transfer gate 30 supplies a third digit output on four wires in a cable 74 to an input 76 of a tens half 78 of a point register 80 through an OR-gate 82. Transfer gate 32 supplies a fourth digit output on four wires in a cable 84 to an input 86 of a units half 88 of point register 80 through an OR-gate 90.

A transfer gate 92 has a data input 94 receiving a constant output from a BCD source 96 of four 0s. A control input 98 for transfer gate 92 receives the output from an AND-gate 100 which has one input receiving strike output 14 and the other input receiving the output of AND-gate 40. When AND-gate 100 is enabled, the four 0s are supplied on the four wires in an output cable 102 through OR-gates 72, 82 and 90 to group register 64 and point register 80.

The tens half 62 and the units half 70 of group register 64 supply outputs on four-wire cables 104 and 106, respectively, to a group interface 108 which has a plurality of outputs 110, 112 and 114 supplying group inputs 116, 118 and 120, respectively, to a memory 122. The tens half 78 and the units half 88 of point register 80 supply outputs on four-wire cables 124 and 126, respectively, to a point interface 128 which has a plurality of outputs 130, 132, 134 and 136 supplying point inputs 138, 140, 142 and 144, respectively, to memory 122.

Any suitable apparatus may be utilized for memory 122. For example, a pinboard system may be utilized whereby a plurality of wires are arranged in cross-point or matrix fashion with one side of the pinboard system corresponding to groups and the other side corresponding to points. While only three group inputs are illustrated, there will be as many group inputs to memory 122 as there are groups of field points up to a maximum of 100; and, similarly, while only four point inputs are illustrated, there will normally be 100 point inputs to memory 122. Thus, the field points will be arranged in groups of up to 100 points; however, there need not actually be a valid field point for each possible address, as will be explained hereinafter. Where valid field points exist, a conductive pin will be inserted to electrically connect the group and field input wires, and there will be no electrical connection for addresses which correspond to no existing field point.

The output from group interface 108 corresponding to an addressed group will have a positive potential thereon; and, similarly, the output from point interface 128 corresponding to an addressed point will have a negative potential thereon. By connecting a coil in series with each group input or each point input, the existence of a field point at every possible address can be determined by detecting the status of a pair of contacts controlled by the coils. In order to cooperate with the 1 logic of the illustrated system, the contacts will be connected between a ground potential and a sense output 146 and will be normally open such that the sense output 146 is 1 when no valid field point exists at an address and 0 for valid existing field points.

The outputs on cables 104 and 106 from group register 64 and the outputs on cables 124 and 126 from point register 80 are supplied as inputs to a visual display 148 and as data inputs to a transfer gate 150. Display 148 represents the four digits of an addressed field point and has a control input 152 which permits operation of display 148 when a 1 is received and blanks the display when a 0 is received. Transfer gate 150 has a control input 154 and a plurality of outputs 156 which contain the address of a selected field point. Outputs 156 are supplied to the remotely positioned field points, normally through a decoding interface, to enable the addressed field point and permit functional operation thereof.

Cancel pushbutton C provides a 1 on an output 158 when depressed, and output 158 is supplied to reset input 48 of counter 34 and as a set input to a flip-flop 160. The $\overline{Q}$-output of flip-flop 160 is supplied to control input 152 of display 148, to control input 154 of transfer gate 150, and as an input to AND-gates 162 and 164. AND-gate 162 also receives inputs from strike output 14, the output from AND-gate 40, sense output 146 from memory 122 and the $\overline{Q}$-output of a flip-flop 166, and the output of AND-gate 162 is supplied to an error detector 168. AND-gate 164 also receives inputs from sense output 146, the Q-output of flip-flop 166 and a source of clock pulses 170.

Pushbuttons NG, LG, NP and LP have outputs 172, 174, 176 and 178, respectively, which are each supplied to OR-gates 180 and 182. OR-gate 180 also receives strike output 14 from numerical keys 12 and supplies an output to the reset input of flip-flop 160. OR-gate 182 supplies an output to the set input of flip-flop 166, and flip-flop 166 receives a reset input from strike output 14. Outputs 172 and 176 from pushbuttons NG and NP are supplied to an OR-gate 184 which has an output providing a set input to a flip-flop 186, and outputs 174 and 178 from pushbuttons LG and LP are supplied to an OR-gate 188 which has an output providing a reset input to flip-flop 186. The Q- and $\overline{Q}$-outputs from flip-flop 186 are supplied to control inputs 190 and 192 of group register 64 to control forward and reverse counting thereof and to control inputs 194 and 196 of point register 80 to control forward and reverse counting thereof.

The output of AND-gate 164 is supplied to an OR-gate 198 along with outputs 176 and 178 from pushbuttons NP and LP, and the output from OR-gate 198 is supplied at a count input 200 to the units half 88 of point register 80. The tens half 78 of point register 80 has a carry output 202 supplied to an OR-gate 204 along with outputs 172 and 174 from pushbuttons NG and LG, and the output from OR-gate 204 is supplied at a count input 206 to the units half 70 of group register 64.

Group register 64 and point register 80 are identical in structure and each includes a reversible units decade counter and a reversible tens decade counter coupled together to count to 100 in a conventional manner. The decade counters also have means receiving the digit inputs 60, 68, 76 and 86 to register the digits represented and to count therefrom. Once point register 80 is full, a carry output is provided at 202 in the same manner in which carry outputs are provided from the units decade counters to the tens decade counters.

Interfaces 108 and 128 may include any conventional decoding circuitry to provide a potential on only one output thereof in accordance with the binary outputs from registers 64 and 80. Transfer gates 26, 28, 30, 92 and 150 may include an AND gate for each data input with the AND gates requiring a 1 from the control input to be enabled, as is conventional.

The field points within a supervisory control system which are to be selected with the addressing system of the present invention are arranged in a predetermined order in groups. For instance, all field points for a chiller will be arranged in one group, and all field points for another chiller will be arranged in a second group. The field points are arranged in a numerically similar fashion, such that the last two digits of a field point in the first group are the same as the last two digits of a functionally equivalent or related field point in the second group. As an example, in a chiller group of field points arbitrarily given the address of 11 a compressor control field point may be given the address of 22; and, in another chiller group arbitrarily given the address of 12, a corresponding compressor control field point is given the address of 22. Thus, the total four-digit addresses of the compressor control field points will be 1,122 and 1,222. In this manner all corresponding field points in different groups are given identical field point addresses; and, if there is no corresponding field point in one group, that address is merely omitted. The arrangement of related field points is desirably implemented such that field points whose status are frequently checked or field points controlling the starting and stopping of motors which are frequently operated are given the same point address in each group.

In operation, an operator may select any desired field point by sequentially depressing four numerical pushbuttons 12 corresponding to the four-digit address of the field point. The first button depressed corresponds to the first digit or group tens; and, similarly, the second, third and fourth buttons depressed correspond to the second digit or group units, the third digit or point tens, and the fourth digit or point units.

Counter 34 is in its initial or reset state at the commencement of addressing operation such that AND-gate 40 is enabled to enable transfer gate 26 and permit the BCD data on output 16 from numerical keys 12 to be supplied to the tens half 62 of group register 64. When the numerical pushbutton is released an advance pulse is received at input 33 of counter 34 to move the counter to its second state thereby enabling AND-gate 42, as previously mentioned. Thus, when the next numerical pushbutton 12 is pressed the BCD data on output 16 will be supplied to units half 70 of group register 64 through transfer gate 28. In a similar fashion, third digit BCD data corresponding to the third numerical pushbutton 12 depressed is supplied to tens half 78 of point register 80 through transfer gate 30, and fourth digit BCD data corresponding to the fourth numerical pushbutton 12 depressed is supplied to units half 78 of point register 80 through transfer gate 32.

Registers 64 and 80 supply data corresponding to the first, second, third and fourth digits on outputs 104, 106, 124 and 126, respectively, to interfaces 108 and 128 which each energize with positive and negative potentials, respectively, only one output thereof. If a valid field point corresponding to the address exists, sense output 146 will be 0 to inhibit operation of AND-gates 162 and 164. If there is no valid field point for the address, sense output 146 will be 1; however, since flip-flop 166 will be reset by strike output 14, the Q-output thereof will be 0 to inhibit AND-gate 164. The strike output 14 also assures that flip-flop 160 is reset thereby providing a 1 at the Q-output thereof which is applied to AND-gate 162. The Q̄-output of 166 is also a 1 as applied to AND-gate 162 since the flip-flop is reset, as previously described; and, once all four digits have been addressed by numerical pushbuttons 12, counter 34 will have been returned to its initial state to enable AND-gate 40 to provide a 1 to AND-gate 162. The strike output 14 will be inverted to a 1 as applied to AND-gate 62 at this time; and, accordingly, AND-gate 162 will be enabled once the complete address of an invalid nonexisting field point has been entered into the system to energize error detector 168 to indicate to the operator that the addressed field point does not exist.

The outputs from registers 64 and 80 are supplied to the field points through transfer gate 150 and are visually represented at display 158 since flip-flop 160 is reset and the Q̄-output thereof is 1. Thus, the operator may view the selected field point to make sure that no errors have occurred and that the desired field point has been addressed.

When the first digit of a field point address is selected by actuating one of numerical pushbuttons 12, AND-gate 100 is enabled in response to the enabling of AND-gate 40 and the 1 at strike output 14. Thus, the four-0 BCD data input from source 96 is passed through transfer gate 92 to the units half 70 of group register 64 and the tens half 78 and the units half 88 of point register 80, and display 148 will represent the first digit selected with the remaining three digits being decimal zeros. Confusion of the operator is, accordingly, obviated since, even though display 148 changes with each selected digit, the initial zero representations provide a means of easily following the addressing of a field point.

Once a field point has been addressed, a related field point may be addressed by depressing one of pushbuttons NG, LG, NP or LP. For instance, if it is desired to address the previous or last valid field point in the same group, pushbutton LP is depressed which provides a 1 on output 178 to assure that flip-flop 160 is reset and flip-flop 166 is set to supply 1s to AND-gate 164. The 1 on output 178 also resets flip-flop 186 to render registers 64 and 80 in a backwards counting mode and supplies a count pulse at input 200 to units half 88 of point register 80. Register 64, thus, counts one backwards to change the stored address, and the new address is supplied to memory 122 in the manner previously described to determine the validity of the new address. If the new address does not correspond to a valid field point, the 1 on sense output 146 from memory 122 will enable AND-gate 164 to supply a clock pulse from source 170 to count input 200 of point register 64. Point register 80 will, therefore, count one backwards again, and the new address will again be checked for validity. This process is continued until the last valid field point is addressed, at which time AND-gate 164 will be inhibited to prevent the supply of further clock pulses to point register 80.

If it is desired to address the next field point in the same group, pushbutton NP is depressed to provide a 1 on output 176 to assure that flip-flop 160 is reset and flip-flop 166 is set to supply 1s to AND-gate 164. The 1 on output 176 also sets flip-flop 186 to render registers 64 and 80 in a forward counting mode and supplies a count pulse to input 200 of units half 88 of point register 80. Register 80, thus, counts forward until the stored address is changed to the next valid point in the manner above described with respect to addressing of the last valid field point.

A field point in the last group related to the presently addressed field point may be addressed by depressing pushbutton LG, which places a 1 on output 174 to assure that flip-flop 160 is reset and flip-flop 166 is set to supply 1s to AND-gate 164. The 1 on output 174 also resets flip-flop 186 to render registers 64 and 80 in their backward counting mode and supplies a count pulse to input 206 of units half 70 of group register 64. Register 64, thus, counts one backward from the stored group address to address the same number point in the last group; and, if the new address does not correspond to a valid field point, AND-gate 164 will be enabled to supply clock pulses from source 170 to point register 80 to count backwards to the last valid point in the newly addressed group.

By depressing pushbutton NG a field point in the next group related to the presently addressed field point may be addressed. A 1 is provided on output 172 to assure that flip-flop 160 is reset and flip-flop 166 is reset to supply 1s to AND-gate 164. The 1 on output 172 also sets flip-flop 186 to render registers 64 and 80 in a forward counting mode and supplies a count pulse to input 206 of units half 70 of group register 64. Register 64 thus counts 1 forward to address the same numerical point in the next group. Register 80 will count forward in response to clock pulses from source 170 if the new address does not correspond to a valid field point.

Cancel pushbutton C may be depressed prior to, during or after addressing operation and serves to reset the system to its initial state. A 1 is provided on output 158 to set flip-flop 160 and to reset counter 34. The 0 on the Q̄-output of flip-flop 160 inhibits operation of display 148 and transfer gate 150. The system may then be placed in an operative position by depressing any of the numerical pushbuttons 12 or pushbuttons NG, LG, NP or LP which operate to reset flip-flop 160 and enable transfer gate 150 through OR-gate 180.

During forward counting operation of point register 80 when the register is full a carry pulse will be provided on output 202 and supplied to input 206 of group register 64 to count forward to the first valid field point in the next succeeding group. When group register 64 is full a pulse received at input 206 will cause register 64 to revert to the first numerically ordered group.

Thus, it may be seen that due to the circuitry of the present invention and the manner in which the field points are arranged in groups in memory 122, an operator may easily address related field points by depressing pushbuttons NG and LG. Accordingly, in order to control the operation of frequently operated motors the operator need only address a first motor control field point in one group by the use of numerical keys 12; and, thereafter, to address corresponding motor control field points in the next group or the last group, the operator need only depress pushbuttons NG or LG, respectively. In this manner the operator may quickly and efficiently run through all related points in the supervisory control system. Due to the arrangement of the points in numerical order with respect to related functions, upon addressing one field point in a group, the operator may simply jump to the next valid field point or the last valid field point by merely depressing pushbuttons NP or LP, respectively.

The method of addressing field points according to the present invention may be accomplished by programming a computer to function in an equivalent manner to the operation previously described. That is, an operator may enter a selected field point into group and point registers within the computer and may further select a field point in the next group or the last group or a previous or following point within the same group by depressing pushbuttons NG, LG, NP or LP, respectively. By comparing the newly addressed field point with the stored addresses of valid field points in a properly programmed computer memory the addresses in the registers will be changed to a valid field point. An example of a computer capable of being programmed in accordance with the present invention is the Westinghouse Prodac Computer.

Inasmuch as the present invention is subject to many variations, modifications and changes in detail, it is intended that all matter contained in the foregoing description or shown in the accompanying drawing shall be interpreted as illustrative and not in a limiting sense.

What is claimed is:

1. A system for addressing a plurality of field points arranged in groups with each field point having a group address formed by a units digit and a tens digit, and a point address following the group address, said system comprising group register means including first storage means for storing said units digit and second storage means for storing said tens digit of a group address for a selected field point, and group counting means having a group count input means and being responsive to a signal at said group count input means to change said stored address, said group counting means including a units decade counter connected with said first storage means and a tens decade counter connected with said second storage means;

point register means for storing a point address for a selected field point, said point register means including point counting means having a point count input and being responsive to a signal at said point count input to change said stored point address;

field point selection means including group address means connected with said group register means and point address means connected with said point register means to enter the group address and the point address of the selected field point to said group register means and said point register means, respectively;

group address change means connected with said group register means and having an actuated state to supply a signal through said group count input to said units decade counter to change said stored group address;

and point address change means connected with said point register means and having an actuated state to supply a signal to said point count input to change said stored point address;

said group register means and said point register means having output means for providing a complete field point address whereby said complete field point address may be changed to a new field point address having the same point address as said stored point address but in a different group from the group corresponding to said stored group address when said group address change means is in said actuated state and said complete field point address may be changed to a different field point address having the same group address as said stored group address when said point address change means is actuated.

2. The invention as recited in claim 1 wherein the group address of each field point includes a group tens digit and a group units digit and the point address of each field point includes a point tens digit and a point units digit, said group register means includes first storage means for storing the group tens digit of said selected field point and second storage means for storing the group units digit of said selected field point, said point register means includes third storage means for storing the point tens digit of said selected field point and fourth storage means for storing the point units digit of said selected field point, said group counting means includes a group tens decade counter controlling said first storage means and a group units decade counter receiving said group count input and controlling said second storage means, said point counting means includes a point tens decade counter controlling said third storage means and a point units decade counter receiving said point count input and controlling said fourth storage means, and said field point selection means includes sequencing means for sequentially supplying said group tens digit, said group units digit, said point tens digit and said point units digit to said first, second, third, and fourth storage means, respectively.

3. The invention as recited in claim 2 wherein said sequencing means includes a binary counter having first, second, third and fourth outputs and first, second, third and fourth gates receiving said group tens digit, said group units digit, said point tens digit and said point units digit, respectively, and responsive to said first, second, third and fourth outputs, respectively, to sequentially supply said group tens digit, said group units digit, said point tens digit and said point units digit to said first, second, third and fourth storage means, respectively.

4. The invention as recited in claim 1 and further including memory means storing the addresses of all valid field points and having group input means and point input means, said group register means supplies said stored group address to said group input means, said point register means supplies said stored point address to said point input means, said memory means supplying a sense output indicating the validity of the field point corresponding to said stored group and point addresses, and said sense output controls clock means to supply clock pulses to said point count input of said point counting means to change said stored point address if said stored point and group addresses do not correspond to a valid field point.

5. The invention as recited in claim 4 wherein said group change means includes group forward means having a first output connected with said group count input and group backward means having a second output connected with said group count input, said point change means includes point forward means having a third output connected with said point count input and point backward means having a fourth output connected with said point count input, said group counting means and said point counting means have forward and backward counting modes of operation, and further including counting control means connected with said group counting means and said point counting means to control the mode of operation thereof, said counting control means receiving said first and third outputs and responsive to either one thereof to place said group counting means and said point counting means in said forward counting mode of operation and said counting control means receiving said second and fourth outputs and responsive to either one thereof to place said group counting means and said point counting means in said backward counting mode of operation.

6. A method of addressing field points through a computer with each field point having a group address and a point address including the steps of arranging the field points in groups and providing related field points in different groups with the same point address;

storing the group and point addresses of valid field points in a memory;

storing the group address of a selected field point in a group register;

storing the point address of the selected field point in a point register;

changing the group address stored in the group register without changing the stored point address in the point register;

comparing the changed group address and the stored point address with the group and point address of valid field points stored in the memory; and changing the stored point address if no valid field point has the changed group address and the stored point address.

7. The invention as recited in claim 6 wherein said step of changing the group address includes counting forward to the next step and said step of changing the stored point address includes counting forward to the next valid field point.

8. The invention as recited in claim 6 wherein said step of changing the group address includes counting backward to the last group and said stop of changing the stored point address includes counting backward to the last valid field point.

9. The invention as recited in claim 6 and further including the step of sequentially entering the group and point addresses of the selected field point in the group and point registers.

10. A method of addressing field points through a computer with each field point having a group address and a point address including the steps of
arranging the field points in groups and providing sequential numerical addresses for functionally related field points;
storing the group and point addresses of valid field points in a memory;
storing the group address of a selected field point in a group register;
storing the point address of the selected field point in a point register;
changing the point address stored in the point register without changing the stored group address in the group register;
comparing the stored group address and the changed point address with the group and point address of valid field points stored in the memory; and
changing the point address again if no valid field point has the stored group address and the changed point address.

11. The invention as recited in claim 10 wherein said steps of changing the point address include counting forward to the next point.

12. The invention as recited in claim 10 wherein said steps of changing the point address include counting backward to the last point.

13. The invention as recited in claim 10 and further including the step of sequentially entering the group and point addresses of the selected field point in the group and point registers.

* * * * *